United States Patent [19]

Andre et al.

[11] Patent Number: 4,682,922
[45] Date of Patent: Jul. 28, 1987

[54] VEHICLE WHEEL SUPPORT AND FASTENING DEVICE

[75] Inventors: Jean-Luc Andre, Dangolsheim; Christian Fity, Illkirch, both of France

[73] Assignee: Lohr S.A., Hengenbieten, France

[21] Appl. No.: 783,201

[22] Filed: Oct. 2, 1985

[30] Foreign Application Priority Data

Nov. 19, 1984 [FR] France .................. 84 17710

[51] Int. Cl.⁴ .................................................. B60P 3/07
[52] U.S. Cl. .......................................... 410/30; 410/9; 410/19
[58] Field of Search .................... 410/2–13, 410/28, 28.1, 26, 30, 24, 24.1, 25, 27, 29, 29.1, 19; 296/11 A

[56] References Cited

U.S. PATENT DOCUMENTS

| | | | |
|---|---|---|---|
| 1,745,982 | 2/1930 | Copony | 410/8 |
| 1,778,162 | 10/1930 | Mills | 410/30 X |
| 1,901,103 | 3/1933 | Judd | 410/13 |
| 1,934,841 | 11/1933 | Copony | 410/9 |
| 2,016,430 | 10/1935 | Hice | 410/13 |
| 2,036,212 | 4/1936 | Gwatkin | 410/25 |
| 2,636,772 | 4/1953 | Bridge | 410/26 |
| 2,838,338 | 6/1958 | Kerley et al. | 410/28.1 |
| 4,072,257 | 2/1978 | Hall | 410/3 |
| 4,171,077 | 10/1979 | Richard, Jr. | 410/3 |

*Primary Examiner*—Robert B. Reeves
*Assistant Examiner*—John G. Pido
*Attorney, Agent, or Firm*—Erwin S. Teltscher

[57] ABSTRACT

A device adapted to accomodate at least one wheel of a vehicle, particularly for use and installation in car-carriers, which includes an elongated side rail constituting a vehicle loading level, and a carrying trolley slidably arranged on the elongated side rail. The carrying trolley has pivotally mounted thereon a pair of elongated sustaining arms, which normally extend at a slight convergence to, but nearly parallel with one another in an operative position thereof, and are spaced from one another by a predetermined distance, but are pivotably foldable through respective angles of about 90°, so as to extend in parallel with the side rail.

10 Claims, 1 Drawing Figure

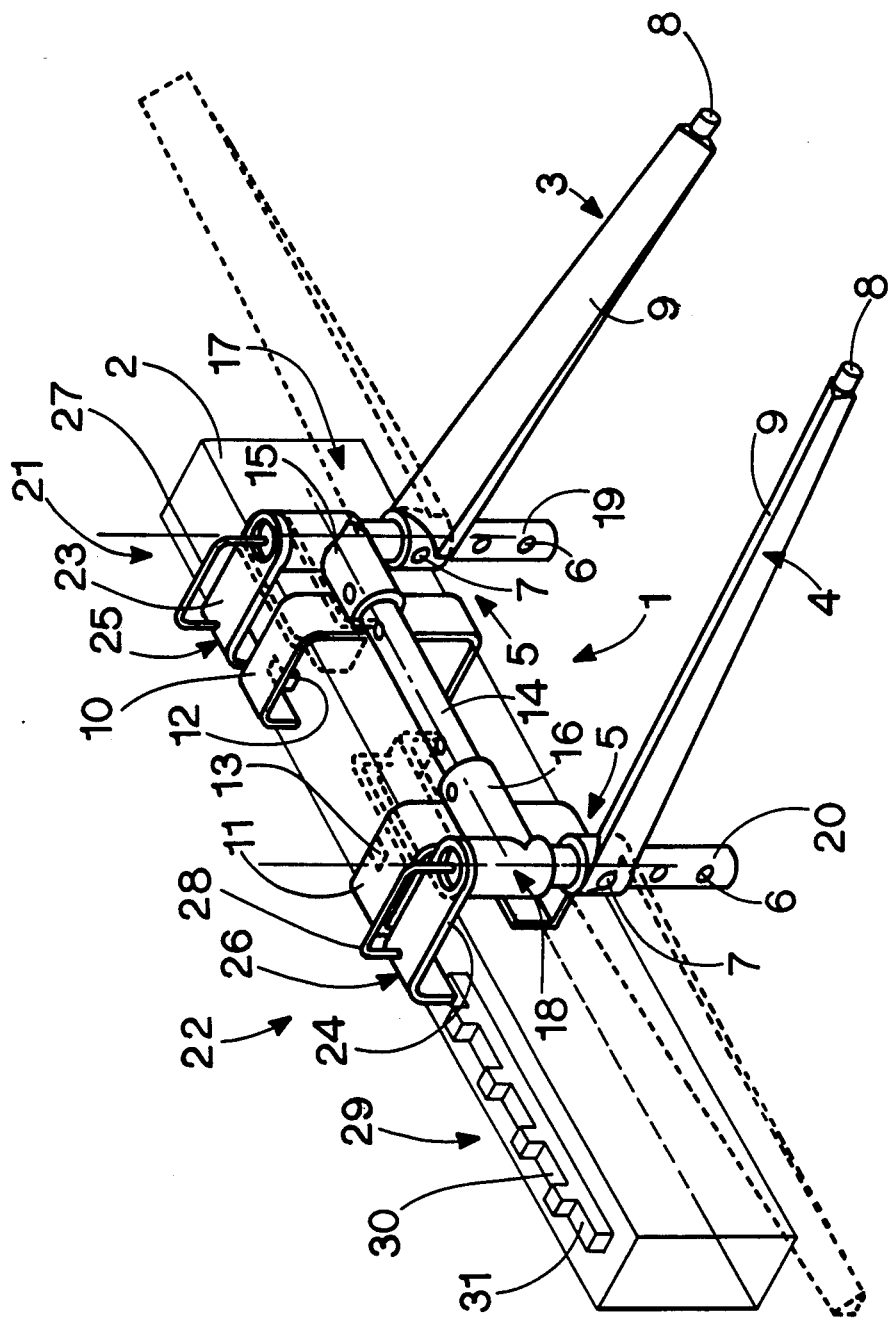

VEHICLE WHEEL SUPPORT AND FASTENING DEVICE

BACKGROUND OF THE INVENTION

This invention concerns a device to fasten and support each single vehicle by the wheels, and is to be used more particularly in car-carriers.

The highway code regulations limit the overall height of vehicle carriers. The inventors conceived and realized a device making it possible to carry an extra level of vehicles by dispensing with the upper carrying platforms; the cars will be borne by transverse side-structures particular to each wheel-train. The structures can be moved along the outer side-rails which are sustained by the trailer posts or the carrying vehicle posts.

Thus, it becomes possible to fit the top of the lower tier cars into the space between the subframe of the upper cars and their ground clearance: the invention saves the height of the platforms: in this way it is possible to load three levels of cars of almost any existing size.

The bearinng structures of this type of vehicle are situated on both sides of each side-rail. They are tubular with divergent extremities to sustain the wheels by bearing on the tires. The extremities are curves so as to fit into locking devices that can be moved along and fastened on to the carrying outer sied-rails.

For the loading, this new kind of car-carrier requires the use of cross structures on the loading area and the possibility of blocking them in positions determined by the loading program.

These structures, fixed and fitted to the loading area, constitute an extra height that cars must go through before being put in place.

Furthermore, the structures have to be set out and placed accurately before allowing the cars to get on to the loading area.

Lastly, before loading it is necessary to shift the mobile parts and to find out the best positions; all these tasks are disliked by the personnel and are strenuous.

The purpose of this invention is to overcome these drawbacks by submitting a fastening and sustaining device that can be used easily and that remains in place on the outer side-rails while loading or unloading.

SUMMARY OF THE INVENTION

The fastening and sustaining device of the invention is characterized by its two arms bearing on each wheel, on the whole width of the tire, which can be folded back and is fixed to a carrying trolley that can be blocked anywhere along the rails that constitute the intermediate and top levels.

The main advantages of the invention are:

the device is fixed on to the side-rails and is not removable, whether for loading or unloading. In folded back position, it clears the way for the loading and unloading procedure of either level.

Speed and ease of execution.

Both sides of the wheels are fastened and locked once the vehicle has been put in place in the required spot.

Substantial gain of time for both loading and unloading.

It slides easily along the side-rail.

The device is identical for all loading levels. It folds back with a simple, quick movement.

The device is completely handled by someone standing on the ground outside the vehicle.

BRIEF DESCRIPTION OF THE DRAWING

Further features and advantages of the invention are recorded in the following description: it is one of the many possibilities of the device, with reference to the appended drawing, which is a perspective view of the inventive device.

DESCRIPTION OF THE PREFERRED EMBODIMENT

The fastening and sustaining device comprises a carrying trolley (1) that can travel along the adjacent side-rail (2) and of two sustaining arms (3) and (4) that can be folded back and are fixed to the carrying trolley. The arms (3) and (4) are intended to fasten and sustain each carried vehicle in a locked position under good safety conditions by realizing sloped and distinct carrying planes forming a right angle with each wheel, on the whole width of the tire.

In the represented case, the arms (3) and (4) are pivotally secured to the carrying trolley (1) and more particularly, they pivot between a working position in which they are perpendicular to the adjacent side-rail (2), being slightly squeezed by the side-rails against their opposite counterpart, and a folded back, unloaded position in which they are parallel to the adjacent lateral edge of side-rail (2).

The inventive device is composed of two symmetrical parts that are linked and are of variable spacing. The following description could stand for both of them.

More precisely, the arms (3) and (4) are socket-shaped (5) at one end and perforated by a transverse bore (6) to permit locking at several vertical positions along a pivoting shaft by means of pins or spindles (7), the opposite end being in the shape of an axle (8) to receive a tie-down device.

The body of the arm is bevelled (9) to ensure contact with the tyre and is slightly tapering from the side-rail (2) towards the middle of the car-carrier.

The trolley (1) is shaped so as to fit on and slide along the outside side-rails in accordance with (2) corresponding to the intermediary and upper loading levels of the car-carrier.

Two U-shaped brackets (10) and (11), of slightly thicker section than that of the bar forming the side-rail (2), grip like claws the side-rail, and constitute the structural connection as well as the sliding device. To facilitate the sliding movement, the blocks are equipped with sliding-pads (12) and (13), or else they are coated with slippery surfacing or bearings. They are joined by a spacing-bar (14) which may be cylindrical, fixed by means of sockets (15) and (16), and attached to the U-shaped brackets (10) and (11). The adjustable spacing can be achieved by, for instance, transverse bores tranversed by pins.

On either side of the spacing-bar (14) the trolley adjoins pillow-blocks (17) and (18), which bear horizontally the spacing-bar (14), and vertically the vertical axles (19) and (20), and to the lower side of which are fastened the sustaining arms (3) and (4). The vertical axles can be moved vertically.

The vertical axles form one piece with the top part of the bolts (21) and (22), which are composed of a working handle and a locking handle in the form of an apertured L-shaped bracket (23) and (24), with curved ends topped by a lifting handle (27) and (28).

These L-shaped brackets have the same width as the U-shaped brackets (10) and (11). The handles and the arm of any set are situated according to the described alternate model on an identical vertical level. The slight grip between the arms is due to a small sloping position of the curvatures (25) and (26). The latter have generous contact areas which are covered with a rough covering in order to increase the locking.

As shown herein, the vertical axles (19) and (20) slide freely along the blocks (17) and (18), the vertical downwards fastening being realized by the contact between the top side of the side rails and the L-shaped bracket, the end of which (25) or (26) follow the same outline as the edged curvature of the side-rail.

An extra device (29) for a notched fastening (30) can be realized by fitting, for instance, a rack (31) on the outer lateral face of the side-rail. The rack receives the ends of the L-shaped brackets (25) and (26) and permits a perfect lengthwise high security fastening.

It has to be noticed that the main load-strains are not exerted on the trolley. Indeed, the strains coming from the load borne by the wheels of the carried vehicle are directly transmitted on to the carryibng side-rail through the locking device.

More particularly, by being surrounded in a clasp formed by the arms (3) and (4), the wheel of the carried vehicle exerts on the arms an effect similar to the weight of the vehicle borne by the wheel.

The strain of the wheel on each arm decomposes into a vertical strain, directly transmitted to the side-rail by L-shaped bracket resting on the upper face of the side-rail, and into a horizontal strain which forms a moment sustained by the curved ends (25) or (26). The moment tends to block the device by pushing the curved end against the outer face of the side-rail. The harder the braking, the stronger that pressure of jamming. The result is a self-blocking device, the jamming pressure increasing automatically in proportion to the strain on the trolley.

This intervention simplifies the whole operation of the device.

The vehicles to be carried are brought to the loading area at the planned position. The device of the invention is put in place on each wheel and roughly centered. The sustaining arms are released from their folded back position by using the handles. They rotate vertically by pulling on them. Then, they are blocked by inserting the handles into the side-rails after a possible centering adjustment of the trolley.

Thus, the device is blocked. No other manipulation or movement is necessary.

To unload, just release the handles by lifting them. The arm-handle device is held in a folded back position by moving the block with the handle and inserting it after 90° rotation. In this position, the L-shaped bracket pushes against the front side of the U-shaped bracket and gives it thus a perfectly satisfactory waiting position. In that position, the sustaining device takes up no room on the loading area.

The invention can be modified by those skilled in the art without, however, departing from the invention concept.

we claim:

1. Device adapted to accomodate at least one wheel of a vehicle, particularly for use and installation in car-carriers, comprising in combination
    an elongated side rail constituting a vehicle loading level,
    a carrying trolley slidably arranged on said elongated side rail, said carrying trolley having pivotally mounted thereon a pair of elongated sustaining arms normally extending at a slight convergence to, but nearly parallel with one another in an operative position thereof, and being spaced from one another by a predetermined distance, but being pivotably foldable through respective angles of about 90°, so as to extend in parallel with said elongated side rail.

2. The device according to claim 1, further comprising two blocks mounted on said trolley, and being spaced from one another, a respective axle passing through each of said blocks, said arms being pivotable about respective of said axles, each axle passing through an apertured L-shaped bracket, and having a handle portion in the shape of an inverted U on exiting from a respective upper end of a corresponding of said blocks, a short arm of said L-shaped bracket pointing downwardly, and being capable of contacting an upper side and an outer side of said side-rail, said outer side rail facing away from said troley.

3. The device according to claim 2, wherein said handles are situated on said loading level.

4. The device according to claim 2, further comprising two approximately U-shaped brackets at least partly surrounding said side rail and being integral with respective of said blocks.

5. The device according to claim 2, further comprising two inwardly directed sockets integral with respective of said blocks, and a spacing bar slidably received within said sockets so as to permit adjustment of the spacing between said blocks.

6. The device according to claim 2, wherein said apertured L-shaped brackets diverge slightly outwardly in a direction facing away from said trolley so as to maintain the convergent direction of said sustaining arms.

7. The device according to claim 2, wherein said blocks are slidably mounted on said axles, and said sustaining arms are mounted on respective of said blocks, so that the level of the sustaining arms is variable by adjustment of said blocks along a vertical direction, and further comprising locking means for locking said blocks at a desired vertical level to respective of said axles.

8. The device according to claim 1, wherein said sustaining arms subtend a slight angle in a downward direction with the horizontal, and are adapted to make contact with said at least one wheel of the vehicle.

9. The devices according to claim 1, wherein each sustaining arm has a free end, said free ends being adapted to be equipped with a fastening device.

10. The device according to claim 1, further comprising a notched bar extending along a top portion of said side rail, and wherein said L-shaped brackets are receivable in selected notches of said notched bar.

* * * * *